United States Patent
Herzberg et al.

(10) Patent No.: US 7,124,115 B1
(45) Date of Patent: Oct. 17, 2006

(54) MICRO PAYMENT-BASED ADVERTISING

(75) Inventors: Amir Herzberg, Ramat Efal (IL); Yehiel Yochai, Tel Aviv (IL); Eldad Shai, Ramat Efal (IL); Boaz Binnun, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 09/625,006

(22) Filed: Jul. 25, 2000

(51) Int. Cl.
*G06Q 99/00* (2006.01)
*H04K 1/00* (2006.01)
*H04L 9/00* (2006.01)

(52) U.S. Cl. .......................... 705/64; 705/14; 705/26; 705/27; 705/54; 713/159; 380/201; 380/202; 380/203; 380/204

(58) Field of Classification Search ................ 705/14, 705/26, 27, 54, 64; 380/201–24; 713/159
See application file for complete search history.

(56) References Cited

U.S. PATENT DOCUMENTS

| | | | |
|---|---|---|---|
| 5,305,195 A | | 4/1994 | Murphy |
| 5,819,285 A | * | 10/1998 | Damico et al. .......... 707/104.1 |
| 5,870,546 A | * | 2/1999 | Kirsch ........................ 709/205 |
| 5,937,392 A | | 8/1999 | Alberts |
| 5,991,740 A | * | 11/1999 | Messer ........................ 705/27 |
| 6,029,141 A | * | 2/2000 | Bezos et al. ................... 705/27 |
| 6,055,508 A | * | 4/2000 | Naor et al. .................... 705/11 |
| 6,157,917 A | * | 12/2000 | Barber .......................... 705/26 |
| 6,195,649 B1 | * | 2/2001 | Gifford ........................ 705/14 |
| 6,289,318 B1 | * | 9/2001 | Barber .......................... 705/14 |

OTHER PUBLICATIONS

IBM aplhaWorks, Micro Paymants, May 17, 1999, www.alphaworks.ibm.com/techn/micropayments.*
IBM aplhaWorks, Micro Payments, Discussion: Archived Postings, May 17, 1999, www.alphaworks.ibm.com/forum/micropayments.nsf/archived?OpenView&Start=1&Count+30.*
IBM Corporation (Armonk, NY) at Http://www.alphaworks.ibm.com.

* cited by examiner

*Primary Examiner*—K. Abdi
(74) *Attorney, Agent, or Firm*—Darby & Darby

(57) ABSTRACT

A method for electronic advertising by an advertiser includes posting an advertisement for an item offered to a buyer for purchase from a merchant on a page per fee basis at a predetermined price via a network link to a network address represented in the advertisement by an alias, which conceals the network address from the buyer. Upon receiving an invocation of the link from the buyer, an order is transmitted to the merchant for supply of the item to the buyer in exchange for payment of the price by the buyer. The item is conveyed, responsive to the order, from the merchant to the buyer, and the advertiser receives a predefined portion of the price paid by the buyer in consideration for posting the advertisement.

30 Claims, 3 Drawing Sheets

MICRO PAYMENT-BASED ADVERTISING

FIELD OF THE INVENTION

The present invention relates generally to electronic commerce, and specifically to methods and systems for conveying payments over communication networks.

BACKGROUND OF THE INVENTION

One of the key problems in electronic commerce over the Internet is finding secure and efficient methods of payment for goods and services. Most existing mechanisms support credit card-based payments. The surcharges and delays associated with these transactions, however, present significant problems and make small purchases uneconomic. Mechanisms of micro payment have been developed in order to overcome these problems. Micro payments make it feasible and profitable for merchants to sell information, services and other content over the Internet, even in transaction amounts of a dollar or less.

IBM Corporation (Armonk, N.Y.) has developed a system of Micro Payments, which is described at www.alphaworks.ibm.com. The system enables merchants, such as Internet content providers, to set up "click and pay" links on their Web sites. When an Internet user, referred to herein as a buyer, wishes to receive content from the merchant's site, the user clicks on the appropriate link. A micro payment amount associated by the link, which is set and posted by the merchant, is then automatically transferred from a Client Wallet maintained by the user to the merchant's account. Upon receiving the micro payment, the merchant's Web server downloads the desired content to the buyer, typically in the form of a Web page, which is displayed by the buyer's Web browser. "Content" in this context can comprise substantially any sort of information, entertainment or services that are amenable to this mode of distribution, for example:

Information such as news, financial data, archives, reference sources, sports scores, reviews and consumer information.

Media and entertainment, such as music, video, pictures games and "edutainment."

On-line services, such as search engines, fax, mail, telephony, billboards and classified advertisements.

Products, particularly software.

The IBM Micro Payment system includes three main components:

Billing Server, the Micro Payment "bank," where all server and client management functions are conducted. These functions include adding, disabling and deleting clients; setting credit limits and commission rates; establishing relationships with other Billing Servers; processing payment to merchant accounts; and signing daily certificates.

Merchant Server, maintained by the merchant, enabling the merchant to manage merchant accounts with the Billing Server; and to set up Hypertext Mark-up Language (HTML) Page Per Fee ("click and pay") links and to collect micro payments from buyers who use the links.

Client Wallet, used by the buyer to open and maintain buyer accounts with the Billing Server and to purchase items sold through Page Per Fee links.

The Billing Server sends a daily credential to the buyer. To make a purchase, the buyer proves his identity and creditworthiness by sending a signed purchase order message to the merchant and attaching the credential. (These functions are performed automatically by a plug-in to the buyer's browser.) The merchant then returns the requested Web page or pages to the buyer, after verifying the purchase order with the Billing Server if desired. Periodically, the Merchant Server deposits the purchase orders it has received with the Billing Server and receives in return the designated payment amount, less commissions charged by any Billing Servers that are involved.

Payment of commissions for sales referrals is a well-known business model, which has been extended to the realm of electronic commerce. For example, it is common for one Web site to post an advertisement for goods or services for sale on another Web site. The HTML code of the advertisement typically contains a uniform resource locator (URL) leading to the seller's site. When a user clicks on such an advertisement, the seller's Web page opens on the user's browser, and the user is invited to make the purchase. The advertiser is compensated on the basis of the number of "click-throughs" to the seller's site and/or as a percentage on sales made on such click-throughs. Methods of on-line advertising are described, for example, in U.S. Pat. Nos. 5,305,195 and 5,937,392, whose disclosures are incorporated herein by reference.

While there are various solutions known in the art that enable the advertiser to count the number of click-throughs to the seller's site, it is much more difficult to track the percentage commissions that may be due. This difficulty is particularly intractable in the case of micro payments, in which a great many commission payments in very small amounts are typically involved. Generally, the advertiser must simply trust the seller to deliver the commissions as agreed. Typically, the seller identifies the advertiser by a parameter included in the purchase request submitted by the buyer, by a cookie added to the request, or by an identification of the site from which the buyer linked to the seller's site. The advertiser can know that the seller received the request only if the request is sent through the advertiser. Since the commission amounts are typically small (especially when micro payments are involved), advertisers often have to wait a very long time to be paid, until a sufficient amount of commission payments has accumulated.

SUMMARY OF THE INVENTION

It is an object of some aspects of the present invention to extend the micro payment model so as to enable micro payments to be made to third-party advertisers, as well as to the merchants themselves. In other words, the present invention seeks to provide methods and systems in which such an advertiser may proffer on its own Web site content that is available for a fee on a merchant's Web site. In return, the advertiser receives a share of micro payments made by buyers who access the merchant's content through the advertiser's Web site.

Thus, in preferred embodiments of the present invention, a micro payment system includes at least four parties: a billing server, a merchant, a buyer and an advertiser. The merchant offers content for sale, preferably in the form of "click and pay" Web pages, each with a designated price to the buyer and commission rate to the advertiser. The merchant publishes the price of the content, as well as the commission rates and any other conditions relevant to the advertiser, so that the advertiser may decide whether and how to publish an advertisement for the item. For each page, the merchant defines an alias, identifying the page in such a manner that only the merchant can determine, upon receiving a request for the alias, the real page that is requested. The alias is preferably specific to the advertiser, so that the merchant and/or the billing server, can determine the identity of the advertiser from the alias used. The merchant provide the advertiser with the alias upon request. The advertiser includes the alias in code, preferably in a mark-up language such as HTML, XML or WML, that is used in an advertisement offering the merchant's content on a Web site belonging to the advertiser. The advertiser also receives a password from the merchant, which is then used by the merchant to authenticate content requests made by the advertiser.

The buyer visiting the advertiser's Web site purchases the advertised content by clicking on the advertisement. The buyer's signed purchase order is then passed to the merchant, either directly or through the advertiser. The merchant processes the sale and passes the content back, directly or through the advertiser, to the buyer. Both the advertiser and the merchant can thus have a complete record of all micro payment purchases made through the advertiser, so that the advertiser is assured of receiving the full commission that is due. The commission may be paid either by the merchant or by the billing server, in accordance with whatever agreement the merchant and advertiser have made with one another. The use of aliases to represent the pages purchased by the buyer also prevents the buyer from learning the merchant's URL, making it difficult for the buyer to circumvent the advertiser in subsequent purchases from this merchant. The advertiser will therefore be able to enjoy a long-term revenue stream on repeat purchases.

The present invention thus extends the realm of "click and pay" commerce to include advertisers, as well, in addition to buyers and merchants. It is applicable to substantially any sort of content or other items that are amenable to sale by micro payment. In the context of the present patent application and in the claims, the terms "click and pay" and "page per fee" are used interchangeably to describe methods and systems of commerce in which a buyer is debited directly by a seller for selecting a network link (typically a link on a Web page), without a separate ordering or credit approval process.

There is therefore provided, in accordance with a preferred embodiment of the present invention, a method for electronic advertising by an advertiser, including:

posting an advertisement for an item offered to a buyer for purchase from a merchant on a page per fee basis at a predetermined price via a network link to a network address represented in the advertisement by an alias, which conceals the network address from the buyer;

receiving an invocation of the link from the buyer;

responsive to the invocation, transmitting an order to the merchant for supply of the item to the buyer in exchange for payment of the price by the buyer;

conveying the item, responsive to the order, from the merchant to the buyer; and receiving a predefined portion of the price paid by the buyer in consideration for posting the advertisement.

Preferably, posting the advertisement includes displaying the advertisement on a Web site maintained by the advertiser and accessible to the buyer via the Internet, and receiving the invocation includes receiving an indication that the buyer has selected the link. Further preferably, transmitting the order includes transmitting the order in exchange for a micro payment made from the buyer to the merchant. Most preferably, responsive to the micro payment, a billing server transfers a credit to the merchant, and receiving the predefined portion of the price includes receiving from the billing server a portion of the micro payment. Alternatively, receiving the predefined portion of the price includes receiving from the merchant a portion of the micro payment. In a preferred embodiment, conveying the item includes allowing the buyer to access one or more Web pages of the merchant.

Preferably, the alias is assigned by the merchant to correspond to the item offered for purchase, and sending the communication includes passing the alias, preferably in a coded form, from the advertiser to the merchant. Further preferably, the alias is assigned by the merchant to correspond specifically to the advertiser, among a plurality of advertisers who post the advertisement.

Additionally or alternatively, transmitting the order includes sending a communication from the advertiser to the merchant including an identifying code issued to the advertiser by the merchant. Further additionally or alternatively, transmitting the order includes making a record of the order for use in verifying that the predefined portion of the price is paid to the advertiser by the merchant.

Preferably, posting the advertisement includes posting the advertisement in accordance with advertising terms published by the merchant, and receiving the predefined portion of the price includes receiving the portion as specified by the advertising terms. Most preferably, transmitting the order includes submitting, along with the order, a coded reference to the advertising terms.

There is also provided, in accordance with a preferred embodiment of the present invention, a method for electronic commerce by a merchant, including:

offering an item for purchase by a buyer on a page per fee basis at a predetermined price via a network link;

defining terms for advertising, in accordance with which an advertiser posts an advertisement for the item, the advertisement containing a reference to the network link;

receiving from the advertiser an order for supply of the item to the buyer responsive to invocation of the link in the advertisement by the buyer;

conveying the item, responsive to the order, via the advertiser to the buyer; and receiving payment from the buyer for the item, while a predefined portion of the price is paid to the advertiser in consideration for posting the advertisement, in accordance with the terms of advertising.

There is additionally provided, in accordance with a preferred embodiment of the present invention, apparatus for electronic advertising by an advertiser, including an advertising processor, which is adapted to post an advertisement for an item offered to a buyer for purchase from a merchant on a page per fee basis at a predetermined price via a network link to a network address represented in the advertisement by an alias, which conceals the network address from the buyer, and responsive to receiving an invocation of the link by the buyer, to transmit an order to the merchant for supply of the item to the buyer in exchange for payment of the price by the buyer, to convey the item, responsive to the order, from the merchant to the buyer, and to receive a predefined portion of the price paid by the buyer in consideration for posting the advertisement.

There is further provided, in accordance with a preferred embodiment of the present invention, apparatus for electronic commerce for use by a merchant, including a merchant processor, which is adapted to offer an item for purchase by a buyer on a page per fee basis at a predetermined price via a network link, with defined terms for advertising in accordance with which an advertiser posts an advertisement for the item, the advertisement containing a reference to the network link, the processor being further adapted to convey the item via the advertiser to the buyer in response to an order received from the advertiser for supply of the item to the buyer responsive to invocation of the link in the advertisement by the buyer, and to receive payment from the buyer for the item, while a predefined portion of the price is paid to the advertiser in consideration for posting the advertisement, in accordance with the terms of advertising.

There is moreover provided, in accordance with a preferred embodiment of the present invention, a computer software product for electronic advertising by an advertiser, the product including a computer-readable medium in which program instructions are stored, which instructions, when read by a computer, cause to computer to post an advertisement for an item offered to a buyer for purchase from a merchant on a page per fee basis at a predetermined price via a network link to a network address represented in the advertisement by an alias, which conceals the network address from the buyer, and responsive to receiving an invocation of the link from the buyer, to transmit an order to the merchant for supply of the item to the buyer in exchange for payment of the price by the buyer, to convey the item, responsive to the order, from the merchant to the buyer, and to receive a predefined portion of the price paid by the buyer in consideration for posting the advertisement.

There is furthermore provided, in accordance with a preferred embodiment of the present invention, a computer software product for electronic commerce for use by a merchant, the product including a computer-readable medium in which program instructions are stored, which instructions, when read by a computer, cause to computer to offer an item for purchase by a buyer on a page per fee basis at a predetermined price via a network link, with defined terms for advertising in accordance with which an advertiser posts an advertisement for the item, the advertisement containing a reference to the network link, the instructions further causing the computer to convey the item via the advertiser to the buyer in response to an order received from the advertiser for supply of the item to the buyer responsive to invocation of the link in the advertisement by the buyer, and to receive payment from the buyer for the item, while a predefined portion of the price is paid to the advertiser in consideration for posting the advertisement, in accordance with the terms of advertising.

The present invention will be more fully understood from the following detailed description of the preferred embodiments thereof, taken together with the drawings in which:

DETAILED DESCRIPTION OF PREFERRED EMBODIMENTS

Figure 1:
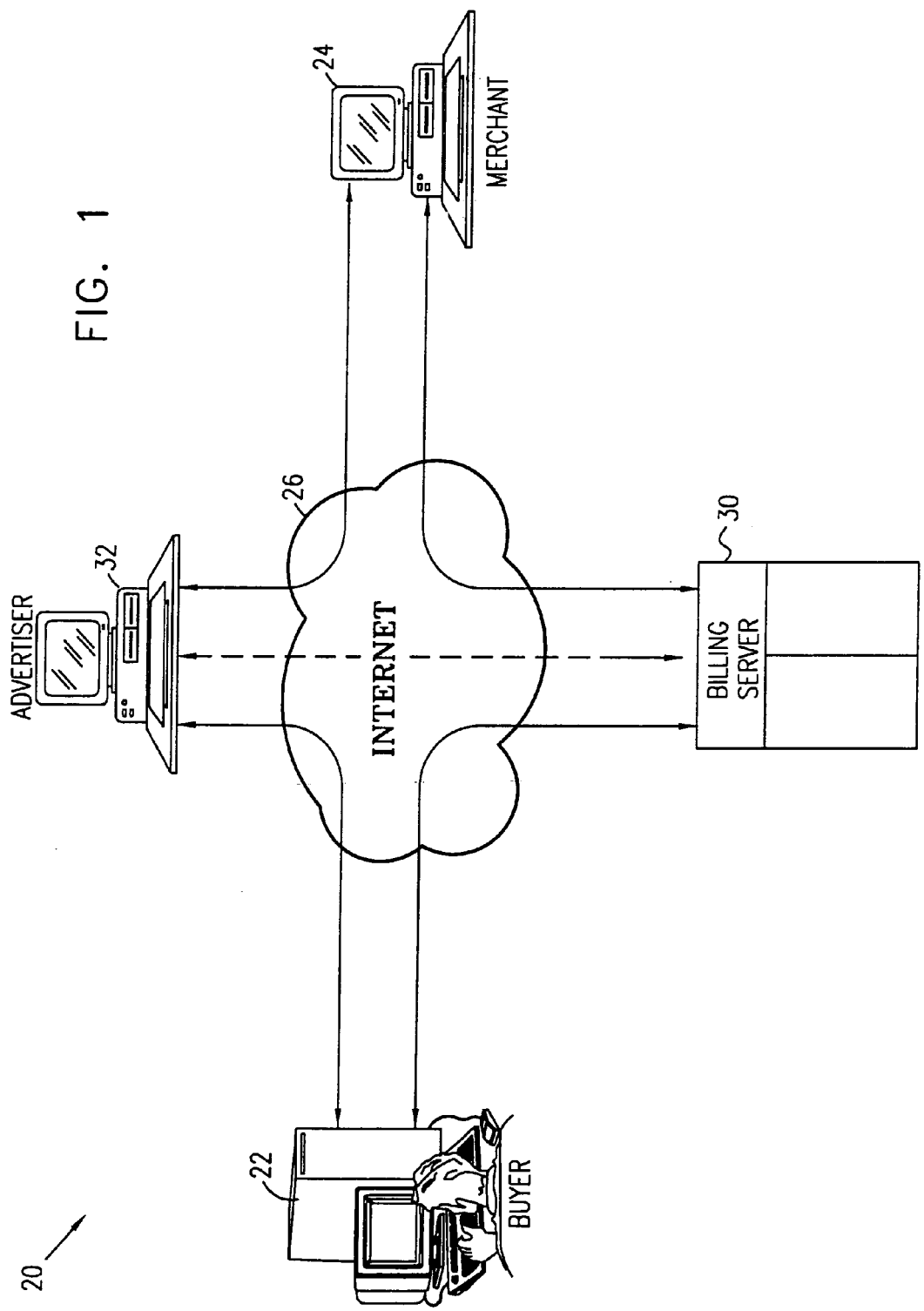
FIG. 1 is a block diagram that schematically illustrates a system for electronic commerce using micro payments, in accordance with a preferred embodiment of the present invention.

FIG. 1 is a block diagram that schematically illustrates a system 20 for electronic commerce based on micro payments, in accordance with a preferred embodiment of the present invention. The system enables a buyer 22 to access and purchase content on a Page Per Fee basis from a merchant 24, via an network 26, typically via the Internet. Payment for the content is made through a billing server 30. In all of these respects, system 20 resembles the IBM Micro Payment system described in the Background of the Invention. Alternatively, elements of other payment systems known in the art, including other micro payment systems, may be used. System 20 differs from all of these prior art systems, however, in that rather than interacting directly with merchant 24, buyer 22 purchases the content through an advertisement posted on a Web site of an advertiser 32. Methods for posting this advertisement and for transfer of content and payments in conjunction with the advertisement are described hereinbelow.

Buyer 22, merchant 24 and advertiser 32 carry out their functions by means of suitably-programmed processors, typically general-purpose computers, linked to network 26. Software needed by these computers and by server 30 to carry out their respective functions may be downloaded to the computers over network 26. Alternatively, the software may be supplied on tangible media, such as CD-ROM or nonvolatile memory.

Figure 2:
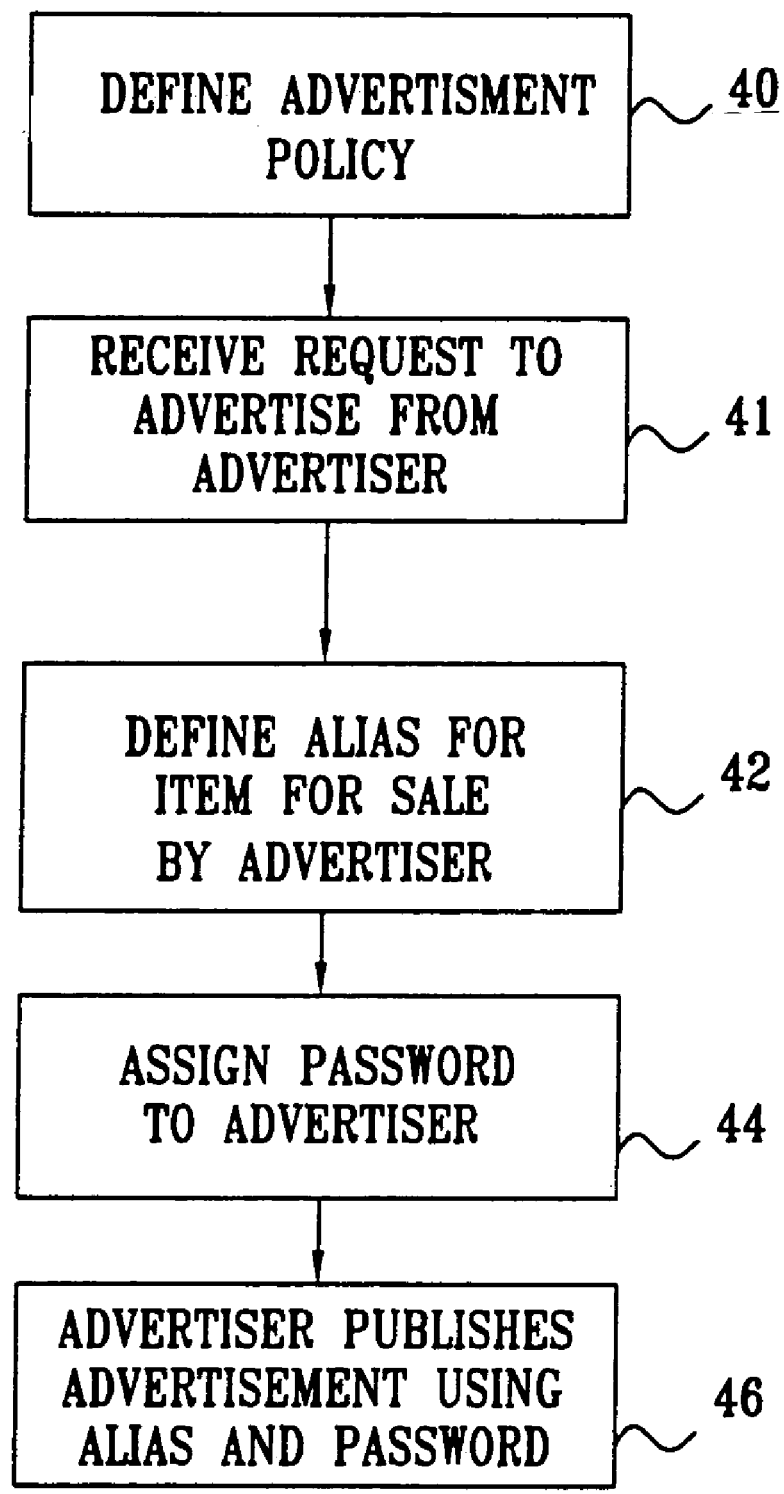
FIG. 2 is a flow chart that schematically illustrates a method for posting an advertisement on a Web site, in accordance with a preferred embodiment of the present invention.

FIG. 2 is a flow chart that schematically illustrates a method for preparing an advertisement on the Web site of advertiser 32, for sale of content by merchant 24, in accordance with a preferred embodiment of the present invention. At a policy setting step 40, the merchant defines an advertisement policy, specifying the commissions that the merchant is willing to pay advertisers for advertising the merchant's content, and who is eligible to become an advertiser under this policy. At an advertisement contract step 41, the merchant receives a request from an advertiser to advertise the content. At an alias definition step 42, the merchant defines an alias for each content page that the advertiser is to offer. The aliases are designed to be used in the advertisement in place of the URLs that would conventionally be used in a Web advertisement to name the pages requested from the merchant. Preferably the aliases are specific to each advertiser and contain the real page names in coded form or point to the real names in a table maintained by the merchant, so that the merchant can efficiently map the aliases back to the original page names, but the buyer cannot.

Each eligible advertiser who wishes to advertise the merchant's content enters into a commission agreement with the merchant, specifying how and when the advertiser is to be compensated. The merchant then provides the advertiser with merchant and advertiser identification codes, along with a unique password, at a password assignment step 44. The password is used subsequently by the merchant to authenticate content requests made through the advertiser. At this point, the advertiser is able to post a suitable advertisement for the merchant's content on the advertiser's Web site, at a publication step 46. Code associated with the advertisement typically contains the following information, preferably in the form of suitable HTML code:

- A description, using text, graphics and/or other media, of the item for sale.
- The alias of the page name corresponding to the item.
- The price of the item (including the advertiser's commission) and duration of validity of the offer.

The merchant identification code.

The advertiser identification code.

The location of a processing script for handling buyer purchase orders.

A reference to the advertiser password, preferably a coded reference generated by a hash function of the password, advertiser identification code and page alias.

A reference to the commission terms to which the advertisement is subject, also preferably coded in the form of a hash function.

Figure 3:
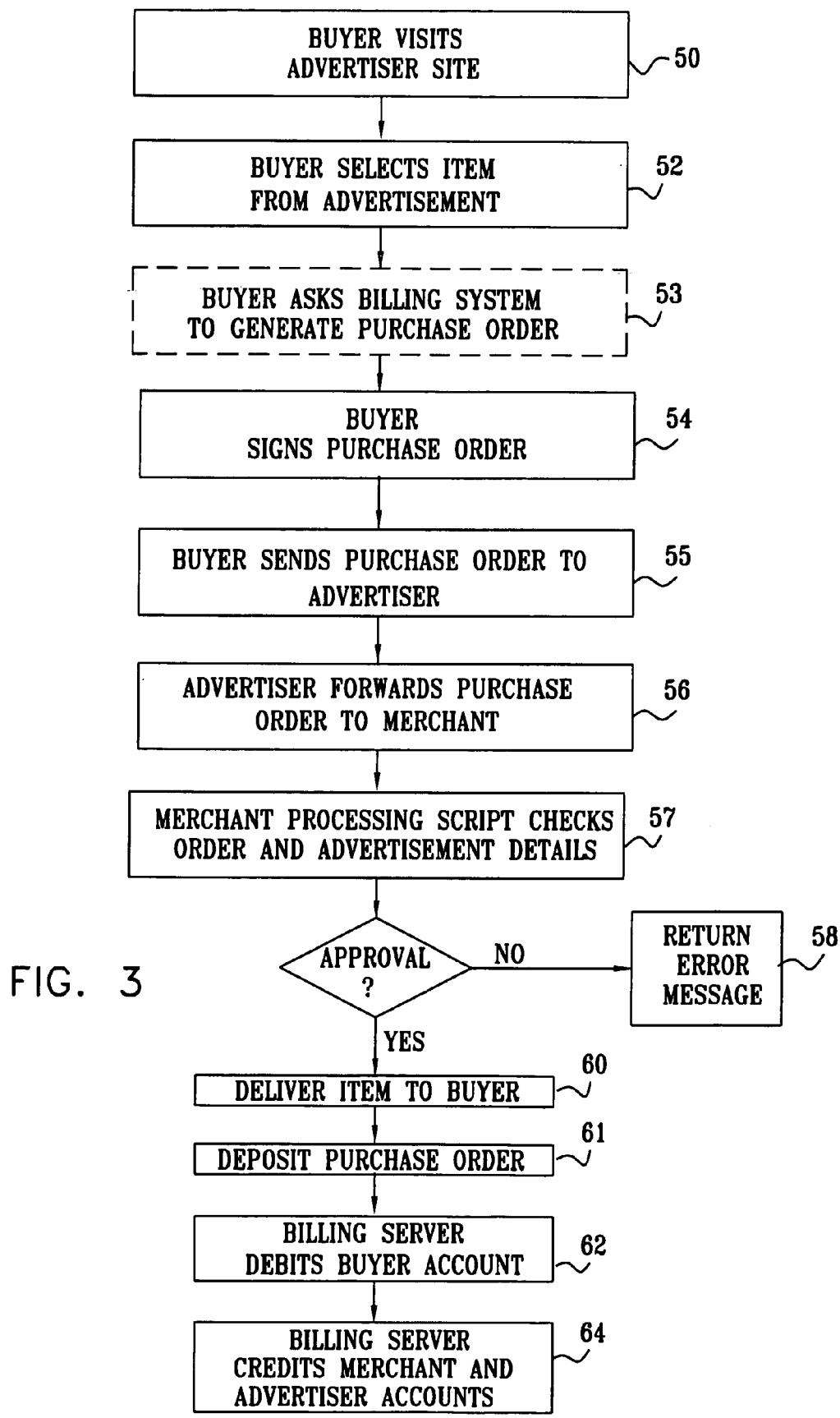
FIG. 3 is a flow chart that schematically illustrates a method for carrying out a transaction through a Web site advertisement, in accordance with a preferred embodiment of the present invention.

FIG. 3 is a flow chart that schematically illustrates a method for receiving and handling purchase orders placed by buyer 22 through advertiser 32, in accordance with a preferred embodiment of the present invention. The method begins at a visitation step 50, when the buyer visits the advertiser's Web site, at which the advertisement posted at step 46 (FIG. 2) is displayed. After reading about the item of content offered in the advertisement, the buyer selects the item, typically by clicking on it with a mouse, at a selection step 52. At this stage, the buyer's computer generates a micro payment purchase order. Alternatively, depending on the configuration of the micro payment system being used, the buyer's computer at this stage asks billing server 30 to generate the purchase order with its signature certifying the payment. In either case, the buyer's computer signs the purchase order, and the order is submitted over network 26 to the advertiser or directly to the merchant, at an order signing step 54. In addition to the electronic signatures of the buyer and/or the billing server, the order may be accompanied by one or more electronic certificates from billing server 30 (or some other reliable source).

At an order submission step 55, the buyer preferably sends the purchase order to the advertiser. Then, at a forwarding step 56, the advertiser forwards the order to the merchant, preferably after checking it as described below. (Alternatively, the buyer may submit the order directly to the merchant.) The merchant checks and approves the order using a processing script, preferably a CGI script or servlet, at a processing step 57. There are a number of elements to the approval process:

1. Approving the purchaser—verifying the buyer's and/or billing server's signature(s) and certificates.

2. Approving the purchase order—verifying that the page identified by the alias is for sale and that the price is acceptable and within the validity period.

3. Approving the advertiser—verifying the advertiser identification and password and that the hashed commission agreement is valid.

The processing script may run on either or both the advertiser's computer and the merchant's computer. Running elements of the script (element 1 and possibly element 2 above) on the advertiser's computer has the advantage of giving the advertiser closer control over sales made through the advertiser. On the other hand, implementation is simpler and faster if the entire script runs only on the merchant's computer, and the advertiser simply passes the purchase order through to the merchant for processing.

At the conclusion of step 57, the merchant and/or advertiser decides whether to approve the order. If any of the required elements is missing or invalid, the order is rejected, and an error message is returned, at an error step 58. Otherwise, the order is approved, and the sale is logged by the merchant and, preferably, by the advertiser. The requested item is then delivered to the buyer, at a delivery step 60, typically in the form of a Web page (identified by its alias) passed from the merchant, either directly or through the advertiser.

At a deposit step 61, the merchant deposits the purchase order with billing server 30. If the order was passed through the advertiser, then the advertiser may submit it as well at this step, to ensure receiving the proper commission. The buyer's account with billing server 30 is debited in the appropriate amount, at a debit step 62, and the merchant and advertiser accounts are credited accordingly, at a credit step 64. If the purchase order was sent directly to the merchant and did not pass throught the advertiser, than it is be the responsibility of the billing server to appropriately credit the advertiser. The advertiser receives the credit in whatever form and amount were agreed upon in the commission agreement. For example, the advertiser's account may be credited directly by the billing server in response to debiting the buyer's account. Alternatively, the merchant may be responsible for transferring the credit or other payment to the advertiser.

Although aspects of the preferred embodiments described hereinabove make particular reference to micro payments, and especially to elements of the IBM Micro Payment system, the principles of the present invention may be applied in a straightforward manner using other tools and methods of electronic commerce, as are known in the art. It should also be understood that although these preferred embodiments are based on Page Per Fee sales of content over the Internet, the business model and methods described herein are applicable generally to sales of different sorts of goods and service items. It will thus be appreciated that the preferred embodiments described above are cited by way of example, and that the present invention is not limited to what has been particularly shown and described hereinabove. Rather, the scope of the present invention includes both combinations and subcombinations of the various features described hereinbefore, as well as variations and modifications thereof which would occur to persons skilled in the art upon reading the foregoing description and which are not disclosed in the prior art.

The invention claimed is:

1. A method for electronic advertising, comprising:

providing a plurality of different aliases to represent a network address of an item offered by a merchant for sale on a page per fee basis at a predetermined price, all of the plurality of aliases representing the same network address;

assigning respective aliases from among the plurality of different aliases to a plurality of advertisers for use by the advertisers in advertising the item and in receiving payment for the sale of the item, such that each respective alias from among the plurality of aliases is assigned by the merchant to specifically identify a respective one of the plurality of advertisers;

posting an advertisement offering the item to a buyer for purchase via a network link represented in the advertisement by the respective alias, which conceals the network address from the buyer;

receiving an invocation of the link from the buyer;

responsive to the invocation, transmitting an order to the merchant for supply of the item to the buyer in exchange for payment of the price by the buyer, the order comprising a message including the respective alias;

conveying the item, responsive to the order, from the merchant to the buyer; and receiving, responsively to the respective alias, a predefined portion of the price paid by the buyer in consideration for posting the advertisement.

2. A method according to claim 1, wherein posting the advertisement comprises displaying the advertisement on a Web site maintained by the advertiser and accessible to the buyer via the Internet, and wherein receiving the invocation comprises receiving an indication that the buyer has selected the link.

3. A method according to claim 2, wherein transmitting the order comprises transmitting the order in exchange for a micro payment made from the buyer to the merchant.

4. A method according to claim 3, wherein responsive to the micro payment and to the respective alias, a billing server transfers a credit to the merchant, and wherein receiving the predefined portion of the price comprises receiving from the billing server a portion of the micro payment.

5. A method according to claim 3, wherein receiving the predefined portion of the price comprises receiving from the merchant a portion of the micro payment.

6. A method according to claim 2, wherein conveying the item comprises allowing the buyer to access one or more Web pages of the merchant.

7. A method according to claim 1, wherein transmitting the order comprises passing the alias in a coded form.

8. A method according to claim 1, wherein transmitting the order comprises sending a communication from the advertiser to the merchant including an identifying code issued to the advertiser by the merchant.

9. A method according to claim 1, wherein transmitting the order comprises making a record of the order for use in verifying that the predefined portion of the price is paid to the advertiser by the merchant.

10. A method according to claim 1, wherein posting the advertisement comprises posting the advertisement in accordance with advertising terms published by the merchant, and wherein receiving the predefined portion of the price comprises receiving the portion as specified by the advertising terms.

11. A method according to claim 10, wherein transmitting the order comprises submitting, along with the order, a coded reference to the advertising terms.

12. A method for electronic commerce by a merchant, comprising:

offering an item for purchase by a buyer on a page per fee basis at a predetermined price via a network link;

providing a plurality of different aliases to represent a network address of the item, all of the plurality of aliases representing the same network address;

assigning a respective alias to each of a plurality of different advertisers, from among the plurality of different aliases, such that each of the plurality of aliases is assigned to specifically identify a respective advertiser among the plurality of advertisers for use by the advertiser in receiving payment for a sale of the item;

defining terms for advertising, in accordance with which each of the advertisers posts an advertisement for the item, the advertisement containing the alias, which serves as a reference to the network link while concealing the network link from the buyer;

receiving from an advertiser among the plurality of different advertisers an order for supply of the item to the buyer responsive to invocation of the link in the advertisement by the buyer, the order comprising a message including the respective alias;

conveying the item, responsive to the order, via the advertiser to the buyer; and receiving payment from the buyer for the item, while a predefined portion of the price is paid to the advertiser, responsively to the respective alias, in consideration for posting the advertisement, in accordance with the terms of advertising.

13. A method according to claim 12, wherein offering the item for purchase comprises offering the item on a Web page of a Web site maintained by the merchant and accessible via the Internet, and wherein conveying the order comprises granting the buyer access to the Web page.

14. A method according to claim 13, wherein receiving the payment comprises receiving a micro payment from the buyer.

15. A method according to claim 14, wherein responsive to the micro payment and to the respective alias, a billing server transfers a credit to the merchant and further transfers the predefined portion of the price to the advertiser.

16. A method according to claim 14, and comprising transferring a portion of the received micro payment from the merchant to the advertiser.

17. A method according to claim 13, wherein defining the terms for advertising comprises defining terms according to which the advertisement is displayed on a Web site of the advertiser.

18. A method according to claim 12, wherein defining the terms for advertising comprises issuing an identifying code to the advertiser, and wherein receiving the order comprises receiving a message including the code.

19. Apparatus for electronic advertising, comprising:

a merchant processor, which is adapted to provide a plurality of different aliases to represent a network address of an item offered by a merchant for sale on a page per fee basis at a predetermined price, all of the plurality of aliases representing the same network address, and to assign respective aliases from among the plurality of different aliases to a plurality of advertisers for use by the advertisers in advertising the item and in receiving payment for the sale of the item, such that each respective alias from among the plurality of aliases is assigned by the merchant to specifically identify a respective one of the plurality of advertisers; and an advertising processor, which is adapted to receive the respective alias assigned by the merchant to an advertiser among the plurality of advertisers, and to post an advertisement offering the item to a buyer for purchase via a network link to the network address represented in the advertisement by the respective alias, which conceals the network address from the buyer, and responsive to receiving an invocation of the link by the buyer, to transmit an order to the merchant for supply of the item to the buyer in exchange for payment of the price by the buyer, the order comprising a message including the respective alias, to convey the item, responsive to the order, from the merchant to the buyer, and to receive a predefined portion of the price paid by the buyer, responsively to the alias, in consideration for posting the advertisement.

20. Apparatus according to claim 19, wherein the advertisement is displayed on a Web site maintained by the advertiser and accessible to the buyer via the Internet, and wherein the processor is adapted to receive the invocation of the link in the form of an indication that the buyer has selected the link.

21. Apparatus according to claim 20, wherein the payment comprises a micro payment transferred by the buyer.

22. Apparatus for electronic commerce for use by a merchant, comprising a merchant processor, which is adapted to offer an item for purchase by a buyer on a page per fee basis at a predetermined price via a network link, to provide a plurality of different aliases to represent a network address of the item, all of the plurality of aliases representing the same network address, and to assign a respective alias to each of a plurality of different advertisers, from among the plurality of different aliases, such that each of the plurality of aliases is assigned to specifically identify a respective advertiser among the plurality of advertisers for use by the advertiser in receiving payment for a sale of the item, with defined terms for advertising the item in accordance with which each of the advertisers posts an advertisement for the item, the advertisement containing the alias, which serves as a reference to the network link while concealing the network link from the buyer, the processor being further adapted to convey the item via an advertiser among the plurality of different advertisers to the buyer in response to an order received from the advertiser for supply of the item to the buyer responsive to invocation of the link in the advertisement by the buyer, the order comprising a message including the respective alias of the advertiser, and to receive payment from the buyer for the item, while a predefined portion of the price is paid to the advertiser, responsively to the respective alias, in consideration for posting the advertisement, in accordance with the terms of advertising.

23. Apparatus according to claim 22, wherein the item is offered on a Web page of a Web site maintained by the merchant and accessible via the Internet, and wherein the processor conveys the item to the buyer by granting the buyer access to the Web page.

24. Apparatus according to claim 23, wherein the payment comprises a micro payment transferred by the buyer.

25. A computer software product for electronic advertising, the product comprising a computer-readable medium in which program instructions are stored, which instructions, when read by first and second computers, cause the first computer to provide a plurality of different aliases to represent a network address of an item offered by a merchant for sale on a page per fee basis at a predetermined price, all of the plurality of aliases representing the same network address, and to assign respective aliases from among the plurality of different aliases to a plurality of advertisers for use by the advertisers in advertising the item and in receiving payment for the sale of the item, such that each respective alias from among the plurality of aliases is assigned by the merchant to specifically identify a respective one of the plurality of advertisers, and wherein the instructions cause the second computer to receive the respective alias assigned by the merchant to an advertiser among the plurality of advertisers, and to post an advertisement offering the item to a buyer for purchase via a network link to the network address represented in the advertisement by the respective alias, which conceals the network address from the buyer, and responsive to receiving an invocation of the link from the buyer, to transmit an order to the merchant for supply of the item to the buyer in exchange for payment of the price by the buyer, the order comprising a message including the respective alias, to convey the item, responsive to the order, from the merchant to the buyer, and to receive a predefined portion of the price paid by the buyer, responsively to the alias, in consideration for posting the advertisement.

26. A product according to claim 25, wherein the advertisement is displayed on a Web site maintained by the advertiser and accessible to the buyer via the Internet, and wherein the instructions cause the computer to receive the invocation of the link in the form of an indication that the buyer has selected the link.

27. A product according to claim 26, wherein the payment comprises a micro payment transferred by the buyer.

28. A computer software product for electronic commerce for use by a merchant, the product comprising a computer-readable medium in which program instructions are stored, which instructions, when read by a computer, cause to computer to offer an item for purchase by a buyer on a page per fee basis at a predetermined price via a network link, to provide a plurality of different aliases to represent a network address of the item, all of the plurality of aliases representing the same network address, and to assign a respective alias to each of the plurality of different advertisers, from among a plurality of different aliases, such that each of the plurality of aliases is assigned to specifically identify a respective advertiser among the plurality of advertisers for use by the advertiser in receiving payment for a sale of the item, with defined terms for advertising the item in accordance with which each of the advertisers posts an advertisement for the item, the advertisement containing the alias, which serves as a reference to the network link while concealing the network link from the buyer, the instructions further causing the computer to convey the item via an advertiser among the plurality of different advertisers to the buyer in response to an order received from the advertiser for supply of the item to the buyer responsive to invocation of the link in the advertisement by the buyer, the order comprising a message including the respective alias of the advertiser, and to receive payment from the buyer for the item, while a predefined portion of the price is paid to the advertiser, responsively to the respective alias, in consideration for posting the advertisement, in accordance with the terms of advertising.

29. A product according to claim 28, wherein the item is offered on a Web page of a Web site maintained by the merchant and accessible via the Internet, and wherein the instructions cause the computer to convey the item to the buyer by granting the buyer access to the Web page.

30. A product according to claim 29, wherein the payment comprises a micro payment transferred by the buyer.

* * * * *